(12) United States Patent
Enriquez

(10) Patent No.: US 6,504,927 B1
(45) Date of Patent: Jan. 7, 2003

(54) MECHANISM FOR MEASURING RESISTANCE OF TELEPHONE SUBSCRIBER LINE AND GENERATING MEASUREMENT AS PULSE WIDTH OF PERIODIC WAVEFORM

(75) Inventor: Leonel Ernesto Enriquez, Melbourne Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 0 days.

(21) Appl. No.: 09/686,517

(22) Filed: Oct. 11, 2000

(51) Int. Cl.[7] .................................................. H04M 1/00
(52) U.S. Cl. ................................ 379/399.01; 379/30
(58) Field of Search ......................... 379/399.01, 400, 379/1.01, 24, 27.01, 26.02, 404, 27.04, 30, 29.11, 22.03

(56) References Cited

U.S. PATENT DOCUMENTS

| | | | |
|---|---|---|---|
| 3,746,795 A | 7/1973 | Fitzsimons | 379/400 |
| 4,192,007 A * | 3/1980 | Becker | 379/399 |
| 4,375,050 A | 2/1983 | Helgerson | 324/540 |
| 4,620,069 A * | 10/1986 | Godwin et al. | 379/22 |
| 4,631,361 A * | 12/1986 | Miller | 379/351 |
| 4,866,768 A | 9/1989 | Sinberg | 379/413 |
| 5,003,554 A * | 3/1991 | Chism | 379/10 |
| 5,109,409 A * | 4/1992 | Bomgardner et al. | 379/377 |
| 5,162,742 A | 11/1992 | Atkins et al. | 324/523 |
| 5,649,009 A * | 7/1997 | Enriquez | 379/399 |
| 5,809,109 A * | 9/1998 | Moyal et al. | 379/22 |
| 6,144,722 A * | 11/2000 | Anderson et al. | 379/27 |
| 6,185,297 B1 | 2/2001 | Casselman | 379/387 |

\* cited by examiner

Primary Examiner—Rexford Barnie
(74) Attorney, Agent, or Firm—Charles E. Wands

(57) ABSTRACT

A periodic waveform-based wireline measurement circuit derives a voltage that is very precisely proportional to the differential voltage across a wireline pair, and uses this voltage to modulate the width of a periodic waveform, such as one derived from a ringing signal. This periodic waveform can be interfaced in an asynchronous manner with digital processing components, such as a DSP codec, to provide for automatic compensation for the resistance of the phone line.

20 Claims, 1 Drawing Sheet

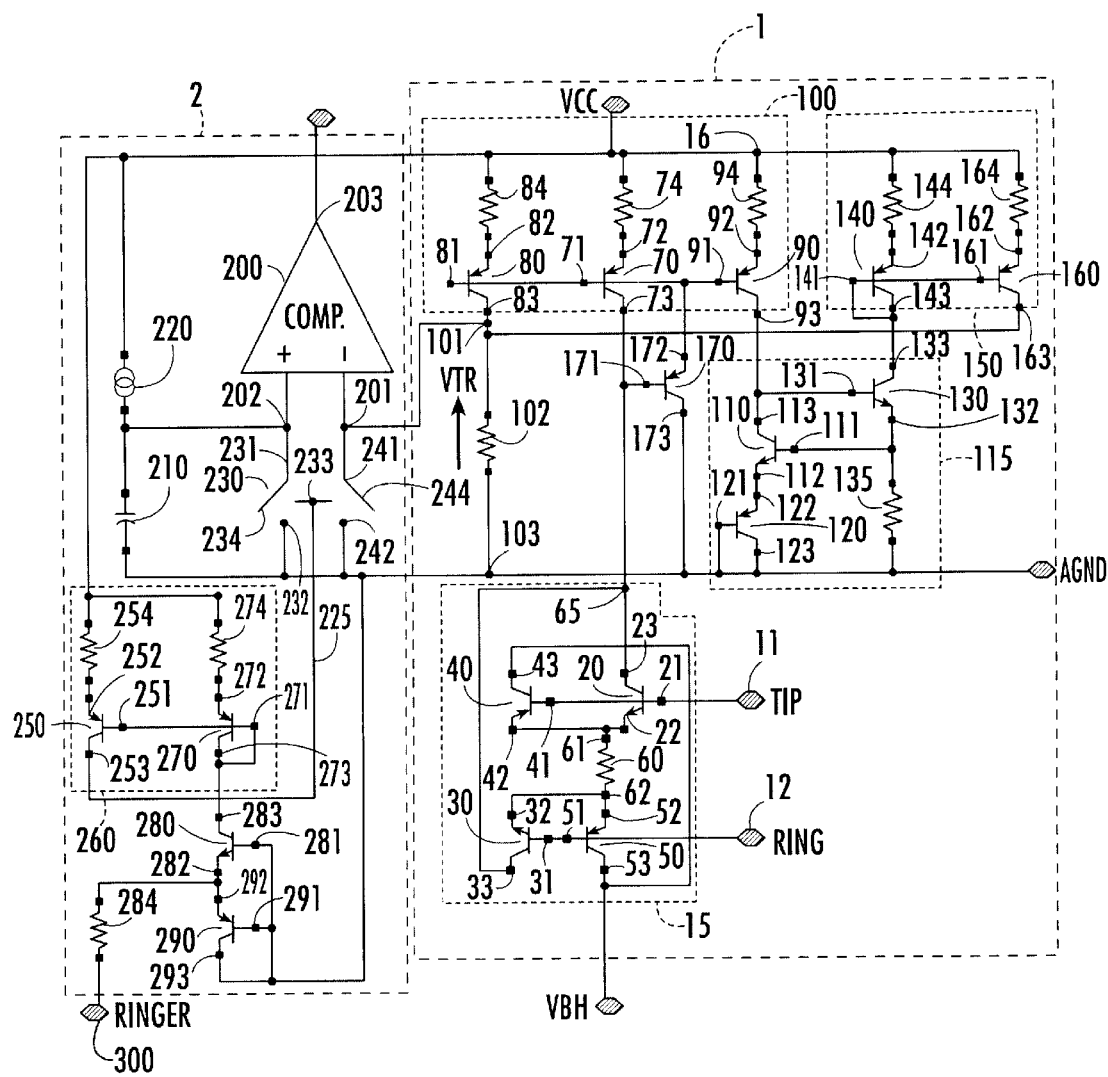

MECHANISM FOR MEASURING RESISTANCE OF TELEPHONE SUBSCRIBER LINE AND GENERATING MEASUREMENT AS PULSE WIDTH OF PERIODIC WAVEFORM

CROSS-REFERENCE TO RELATED APPLICATION

The present application relates to subject matter disclosed in U.S. patent application Ser. No. 09/686,324, filed coincident herewith, entitled: "Precision Loop Voltage Detector for Subscriber Line Interface Circuit Applications," by L. Enriquez (hereinafter referred to as the '324 application), assigned to the assignee of the present application and the disclosure of which is incorporated herein.

FIELD OF THE INVENTION

The present invention relates in general to communication systems and components, and is particularly directed to a periodic waveform-based wireline measurement circuit architecture, that is readily suited for incorporation into a subscriber line interface circuit (SLIC). This architecture is configured to derive a voltage that is very precisely proportional to the differential voltage across the tip and ring leads, and thereby representative of the resistance, of a wireline pair, and to modulate the width of a periodic waveform, such as one derived from a readily available ringing signal, in accordance with the derived voltage.

BACKGROUND OF THE INVENTION

As described in the above-referenced '324 application, a variety of equipments employed by telecommunication service providers employ what are known as subscriber line interface circuits or 'SLIC's, which interface (transmit and receive) communication signals with tip and ring leads of a wireline pair, to which a (remote) piece of subscriber equipment is connected. This wireline pair is not only used to transport AC signals (e.g., voice and/or ringing), as well as substantial DC voltages, but its length can be expected to vary from installation to installation, and may be relatively long (e.g., on the order of multiple miles).

For optimized signal transmission and reception, the SLIC is designed to compensate for signal distortion characteristics of the line (including attenuation). Because distortion characteristics strongly depend upon the length of the line, measuring the differential voltage across its tip and ring leads is usually performed to obtain an indication of line length. However, as the differential line voltage may be quite large, conventional loop voltage measurement circuits cannot be readily incorporated into present day SLIC architectures, that employ transmission channels which must conform with very demanding performance requirements.

These requirements include accuracy, linearity, signals, low noise, filtering, low power consumption, insensitivity to common mode, and ease of impedance matching programmability, that allow the SLIC to be interfaced with a variety of telecommunication circuits, including those providing digital coder/decoder (codec) functionality. Digital signal processor (DSP)-based codecs are currently being used with increasing frequency in telecommunication circuits, due to their ability to automatically compensate for many of the limitations presented by the phone line. Thus, providing line length information in a format that is easily interpreted by the codec function is very desirable feature of any SLIC.

SUMMARY OF THE INVENTION

In accordance with the present invention, this objective is successfully addressed by means of a new and improved wireline measurement circuit architecture, that is designed to be incorporated into a subscriber line interface circuit, and is operative to derive a voltage that is very precisely proportional to the differential voltage across the line's tip and ring leads, and thereby representative of the resistance, of a wireline pair. This derived voltage is then used to modulate the width of a periodic waveform, such as one derived from the ringing signal, in accordance with the derived precision differential tip-ring voltage. With the measured line characteristic information being infused into a periodic waveform, it can be readily interfaced in an asynchronous manner with digital processing components, such as, but not limited to, a DSP codec. The use of a periodic waveform also allows for averaging, so that instantaneous deviations caused by signals on the line can be removed.

As will be described, the duty cycle of successive pulse signals of the periodic waveform (derived from the ringer signal) is modulated in accordance with the differential tip-ring voltage measured between the tip and ring leads of the telephone line. The pulses of the periodic waveform derived from the ringer signal vary in amplitude between first (e.g. relatively positive) and second (e.g., relatively negative) states, with the widths of one of the states (e.g., the relatively negative state) proportional to the instantaneous voltage across the tip and ring terminals to which the wireline being measured is connected. Since differential tip-ring voltage increases with line length, the higher the measured differential voltage, the longer the line (and higher associated resistance), and therefore the wider are the relatively negative states of the pulses, making the duty cycle of the pulse train signal directly proportional to line length. As the current limit setting for the SLIC is known, it is easy to calculate the line resistance of a loop operating at the current limit, as well as to establish a lower bound for the line length for a loop which operates below the current limit.

In order to measure the differential tip-ring voltage, the present invention preferably incorporates a precision loop voltage detector of the type disclosed in the above-referenced '324 application. As described therein, and as will detailed below, this precision loop detector couples a front-end, a complementary transistor pair-configured tip-ring sensing rectifier circuit to the tip and ring leads of the wireline being measured. These complementary transistor pairs are intercoupled through a relatively high valued tip-ring voltage sensing resistor and have a collector-emitter current output path that supplies an output current containing a composite of two voltage-representative current components.

The first voltage-representative current component is representative of the desired differential tip-ring voltage. The second voltage-representative current component (which constitutes an undesired offset) is associated with the internal characteristics (in particular, the base-emitter voltage drops of complementary transistors) of the tip-ring voltage detector. The differential current extraction circuit serves to separate the second current component from the composite current.

Each of the second current component and the composite current is then appropriately scaled, so that when differentially recombined, the scaled version of the second voltage-representative current component (associated with the base-emitter voltages of complementary transistors of the tip-ring voltage detector) is canceled from the composite current, leaving only a current component representative of the differential tip-ring voltage.

The differential current extraction circuit contains a pair of current mirror circuits, and an auxiliary voltage/current reference circuit. A first of the current mirrors generates a first mirrored current component that is fractionally proportional to the composite output current produced by the tip-ring sensing rectifier circuit, and thereby representative of the sum of the differential tip-ring voltage and the base-emitter voltage drops of the complementary pair of transistors of the tip-ring sense rectifier circuit.

The first current mirror also outputs a mirrored current to the auxiliary voltage/current reference circuit. This auxiliary voltage/current reference circuit is comprised of a pair of series-connected, complementary transistors that are coupled across a relatively large valued scaling resistor. The geometries of the transistors of the auxiliary voltage/current reference circuit are such that they operate at the same current densities as the transistor pairs of the tip-ring sensing rectifier.

As a result, the output voltage produced by the auxiliary voltage reference is representative of only the base-emitter voltage drops of one of the complementary pairs of transistors of the rectifier. Therefore, a resultant auxiliary current flowing through the scaling resistor, across which the voltage produced by the auxiliary voltage reference circuit is coupled, corresponds to only the base-emitter voltage drops of a complementary pair of transistors of the tip-sense rectifier circuit.

The auxiliary current is then mirrored and scaled by a second of the two current mirrors as a second current component, that is fractionally proportional to only the base-emitter voltage drops of the complementary pair of transistors of the tip-ring sense rectifier circuit. The two mirrored and scaled currents are then combined at a single ended tip-ring voltage measurement node to which a voltage-dropping output-scaling resistor that is connected. This results in the base-emitter voltage drop components canceling one another, so as to produce a net output current through and thereby tip-ring output voltage across the voltage-dropping output-scaling resistor that is precisely representative of only the differential tip-ring voltage, as desired.

In order to modulate the duty cycle of the waveform derived from the ringing signal in proportion to line length, the precision tip-ring output voltage produced at the single ended tip-ring voltage measurement is coupled to the inverting input of a voltage comparator of a periodic waveform modulator. The comparator has its non-inverting input coupled to a ground-referenced integration capacitor, to which a current source is coupled. The non-inverting input of the comparator is further coupled to a first controlled switch that is selectively closed to connect the non-inverting input of the comparator to ground, or remains open, in accordance with the polarity of the ringing signal. When the ringer voltage is at or above ground potential, the first controlled switch is closed, so as to couple the non-inverting input of the comparator to a zero or logic low potential. On the other hand, when the ringer voltage is below ground potential, the first switch is open, so as to allow whatever voltage is provided across the capacitor to be coupled to the non-inverting input of the comparator.

In a similar manner, the inverting input of the comparator is further coupled to a second controlled switch that selectively connects the inverting input of the comparator to ground or remains open in accordance with the polarity of the ringing signal. As with the first controlled switch, when the ringer voltage is at or above ground potential, the second controlled switch is closed, so as to coupled the non-inverting input of the comparator to zero or logic low potential. On the other hand, when the ringer voltage is below ground potential, the second switch is open, so as to allow the measured scaled tip-ring voltage to be coupled to the inverting input of the comparator.

The periodic waveform modulator operates as follows. During the time that the ringer voltage is in its relatively positive state (above ground potential), both inputs to the comparator are grounded (logical 'low') through the first and second closed switches, so that the comparator output is at a prescribed (built-in) 'high' logic state. When the ringer voltage transitions from its relatively positive state to its relatively negative state, both (closed) switches are opened, and the potential at the inverting input of the comparator rapidly acquires the value of the differential tip-ring voltage. However, the non-inverting input of the comparator initially remains at its zero volt potential, due to the inherent delay associated with the properties of the capacitor. This forces the comparator's output to transition from its previous logic 'high' state to a logical 'low' state.

The potential at the comparator's non-inverting input becomes increasingly positive at a charging rate established by the inherent physics of the capacitor. Within an error introduced by the prescribed (small) built-in offset voltage of the comparator, once the capacitor voltage becomes approximately equal to the measured tip-ring differential voltage, the comparator output transitions from its logical 'low' state back to a logical 'high' state. Thus, the comparator output produces a periodic waveform having a frequency equal to that of the ringer signal, with its waveform being at a logic 'low' state for the duration defined by the magnitude of the measured tip-ring voltage. Namely, the duty cycle of the successive pulses of the periodic waveform derived from the ringer signal will be proportional to the tip-ring voltage of the telephone line.

BRIEF DESCRIPTION OF THE DRAWINGS

The single Figure is a schematic illustration of a non-limiting embodiment of a periodic waveform-based wireline measurement circuit architecture in accordance with the present invention.

DETAILED DESCRIPTION

The periodic waveform-based wireline measurement circuit architecture of the present invention is schematically illustrated in the single Figure as comprising a loop voltage detector section 1 and a periodic waveform modulation section 2. As pointed out above, pursuant to a preferred embodiment of the invention, the loop voltage detector section 1 is configured as detailed in the above-referenced '324 application. As will be described, the loop voltage detector section 1 is configured to produce a single ended, very precise output voltage VTR, that is proportional to the differential voltage across the tip and ring leads of a telephone wireline pair.

This precision voltage VTR is coupled to the periodic waveform modulation section 2, which modulates the width of a periodic waveform, such as a readily available ringing signal, in accordance with the derived precision differential tip-ring voltage. As the magnitude of the differential tip-ring voltage VTR increases with line length, the higher the measured differential voltage, the longer the line (and thus higher line resistance), so that the duty cycle of the pulse train signal is proportional to line length.

The loop voltage detector section 1 is shown as comprising tip and ring terminals 11 and 12, that are adapted to be coupled to respective TIP and RING leads of the telecommunication wireline pair being measured. In order to sense the differential loop voltage across the wireline pair, the terminals 11 and 12 are coupled to a transistor-configured full wave rectifier circuit 15, which contains complementary bipolar transistor pairs, comprised of NPN bipolar transistors 20, 30 and PNP transistors 40, 50, each transistor having a relatively high beta ($\beta$). The complementary pairs are interconnected through a relatively high valued tip-ring sense resistor 60 having a resistance value of $R_{60}$ (e.g, on the order of one megohm).

In particular, the tip node 11 is coupled to the base 21 of NPN transistor 20 and to the base 41 of PNP transistor 40, while the ring node 12 is coupled to the base 31 of NPN transistor 40 and to the base 51 of PNP transistor. The emitter 22 of transistor 20 and the emitter 42 of transistor 40 are coupled in common with a first end 61 of resistor 60, while the emitter 32 of transistor 30 and the emitter 52 of transistor 50 are coupled in common with a second end 62 of resistor 60. The collector 23 of transistor 20 is coupled in common with the collector 33 of transistor 30 and to a tip-ring current measurement node 65, while the collector 43 of transistor 40 is coupled in common with the collector 53 of transistor 50.

Current measurement node 65 is coupled as an input current to the collector 73 of a PNP transistor 70 of a first, three-port, current mirror 100. Transistor 70 has its emitter 72 coupled through resistor 74 to (VCC) power supply rail 16, and its base 71 coupled to the emitter 172 of an NPN transistor 170, the base 171 of which is coupled to the collector 73 of transistor 70, and the collector 171 of which is coupled to ground. The base 71 of current mirror transistor 70 is further coupled in common with the base 81 of a PNP current mirror transistor 80 and with the base 91 of a PNP current mirror transistor 90. Like the transistors of the rectifier circuit 15, each of current mirror transistors 80 and 90 has a relatively high beta ($\beta$).

The current mirror transistor 80 has its emitter 82 coupled through resistor 84 to the (VCC) power supply rail 16, and its collector 83 providing a mirrored output current to a tip-ring voltage measurement node 101. A voltage dropping resistor 102 is coupled between node 101 and a ground (GND) reference terminal 103. Resistor 102 may have a value $R_{102}$ that is a prescribed fraction (e.g., 1/10) of the value $R_{60}$ of resistor 60 in the tip-ring sense rectifier circuit 15. The current mirror transistor 90 has its emitter 92 coupled through resistor 94 to VCC power supply rail 16, and its collector 93 providing a mirrored output current to the collector 113 of an NPN transistor 110 within an auxiliary voltage reference circuit 115.

The auxiliary voltage reference circuit 115 is configured to produce an output voltage that is representative of only the base-emitter voltage drops of one of the complementary pairs of transistors of the rectifier circuit 15. For this purpose, NPN transistor 110 has its emitter 112 coupled to the emitter 122 of a diode-connected PNP transistor 120, the base 121 and collector 123 of which are coupled to ground terminal 103. The geometries (emitter areas) of transistors 110 and 120 are designed so as to operate at the same current densities as transistor pairs 20/50 or 30/40. The base 111 of transistor 110 is coupled to the emitter 132 of NPN level shift transistor 130 and through a scaling resistor 135 to ground. Resistor 135 may have a value $R_{135}$ on the order of one-half of the value $R_{60}$ of resistor 60 (i.e., $R_{135}=R_{60}/2$).

The output voltage produced by the auxiliary voltage reference circuit 115 is representative of only the base-emitter voltage drops of one of the complementary pairs of transistors of the rectifier circuit 15. Consequently, the resultant current flowing through the scaling resistor 135 is representative of only the base-emitter voltage drops of a complementary pair of transistors of the rectifier circuit 15. By appropriately scaling and differentially combining this current with the current mirrored by current mirror transistor 80 of three-port current mirror 100 (which is representative of the composite of the differential tip-ring voltage, plus the base-emitter voltage drops of a complementary pair of transistors of the rectifier), a resultant current representative of only the differential tip-ring voltage can be obtained.

In order to scale the current through resistor 135, the base 131 of transistor 130 is coupled to the collector 113 of transistor 110, and its collector 133 coupled to the base 141 and collector 143 of a diode-connected current mirror PNP transistor 140 within a second, two-port current, mirror 150. Transistor 140 has its emitter 142 coupled through resistor 144 to the VCC rail 16, and its base 141 coupled in common with the base 161 of a current mirror transistor 160. Current mirror transistor 160 has its emitter 162 coupled through a resistor 165 to the VCC rail 16 and its collector 163 coupled to tip-ring voltage measurement node 101.

The current mirror transistor 160 supplies to node 101 a mirrored current representative of only the base-emitter voltage drops of a complementary pair of transistors of the rectifier. Summing the two mirrored and scaled currents at the single ended tip-ring voltage measurement node 101 results in the base-emitter voltage drop components cancelling one another, so as to produce a net output current through the voltage-dropping output-scaling resistor 103 that is representative of only the differential tip-ring voltage ($V_{TIP} - V_{RING}$).

The loop voltage detector section 1 operates as follows.

In the transistor-configured full wave rectifier circuit 15, when the voltage $V_{TIP}$ at the TIP node 11 is more positive than the voltage $V_{RING}$ at the RING node 12, the current $I_{60}$ flowing through resistor 60 may be defined as:

$$I_{60}=(V_{TIP}-V_{RING}-V_{BE20}-V_{BE50})/R_{60}, \tag{1}$$

where $V_{VBE20}$ and $V_{VBE50}$ are the respective base-emitter voltages of transistors 20 and 50.

Conversely, when the voltage $V_{TIP}$ at the TIP node 11 is more negative than the voltage $V_{RING}$ at the RING node 12, the current $I_{60}$ flowing through resistor 60 may be defined as:

$$I_{60}=(V_{RING}-V_{TIP}-V_{BE30}-V_{BE40})/R_{60}, \tag{2}$$

where $V_{VBE30}$ and $V_{VBE40}$ are the respective base-emitter voltages of transistors 30 and 40.

Since the current mirror transistors 80 and 90 of current mirror 100 have relatively high betas, the current $I_{60}$ flowing through resistor 60 and appearing at tip-ring current measurement node 65 flows through the collector-emitter path of transistor 70, and therefrom through resistor 74. For equal geometry transistors, the current $I_{60}$ through transistor 70 is mirrored and attenuated by current mirror transistor 90 and its associated emitter resistor 94 in accordance with the ratios of their emitter resistors (by a factor $K_{90}=4$, as a non-limiting example). The current $I_{60}$ through transistor 70 is further mirrored and attenuated by the current mirror transistor 80 and its emitter resistor 84 by a prescribed factor $K_{80}$ (e.g., $K_{80}=2.5$), and applied to the tip-ring voltage measurement node 101, as a composite current $I_{80}$ representative of the combined differential tip-ring voltage, plus the base-emitter voltage drops of a complementary pair of transistors of the rectifier circuit 15.

The emitter areas $A_E$ of transistors 110 and 120 of the auxiliary voltage reference circuit 115 are designed so as to operate at the same current densities as transistor pairs 20/50 or 30/40 in tip-ring voltage rectifier circuit 15. As a consequence, $$V_{BE110}=(kT/q)\ln(I_{60}/4J_{SN}A_{E110})=$$

$$V_{BE20}=(kT/q)\ln(I_{60}/J_{SN}A_{E20})$$

$$V_{BE50}=(kT/q)\ln(I_{60}/J_{SN}A_{E50})$$

and $$V_{BE120}=(kT/q)\ln(I_{60}/4J_{SP}A_{E120})=$$

$$V_{BE30}=(kT/q)\ln(I_{60}/J_{SP}A_{E30})=$$

$$V_{BE40}=(kT/q)\ln(I_{60}/J_{SP}A_{E40}). \quad (3)$$

The sum of the base-emitter voltages $V_{BE110}+V_{BE120}$ of transistors 110 and 120, respectively, is applied across scaling resistor 135, and the current $I_{135}=(V_{BE110}+V_{BE120})/R_{135}$ therethrough is level shifted by transistor 130 into the collector-emitter path current mirror transistor 140 of two-port current mirror 150. This current $I_{135}$ is mirrored and attenuated by current mirror transistor 160 and resistor 164 by a prescribed factor $K_{150}$ and applied to the tip-ring voltage measurement node 101.

As described above, the mirrored output current $I_{80}$ of current mirror transistor 80 is also applied to the tip-ring voltage measurement node 101. Thus, the current supplied to node 101 and thereby through resistor 102 is the sum of the currents mirrored by current mirror transistors 80 and 160 of respective current mirrors 100 and 150.

From the previous relationships, the expression for the current $I_{135}=(V_{BE110}+V_{BE120})/R_{135}$ may be also be written as:

$$I_{135}=(V_{BE20}+V_{BE50})/R_{135}=(V_{BE30}+V_{BE40})/R_{135} \quad (4)$$

Therefore, the mirrored current component $I_{160}$ flowing through the collector-emitter path of transistor 160 in the two-port current mirror 150 may be expressed as:

$$I_{160}=(1/K_{150})*(V_{BE20}+V_{BE50})/R_{135}, \text{ or}$$

since resistor 135 may have a value $R_{135}$ on the order of one-half of the value $R_{60}$ of resistor 60 (i.e., $R_{135}=R_{60}/2$), $$I_{160}=(2/K_{150})*(V_{BE20}+V_{BE50})/R_{60} \quad (5)$$

The mirrored current component $I_{80}$ through the collector-emitter path of transistor 80 in current mirror 100 may be expressed as:

$$I_{80}=(1/K_{80})*(I_{60})=(V_{TIP}-V_{RING}-V_{BE20}-V_{BE50})/(K_{80}R_{60}) \quad (6)$$

The voltage VTR across nodes 101–103 is the product of the value $R_{102}$ of resistor 102 and the summation of the two mirrored currents $I_{80}$ and $I_{60}$ injected into node 101; namely $$VTR=(I_{160}+I_{80})*(R_{102}), \text{ or}$$

with resistor 102 having a value $R_{102}$ that is a prescribed fraction (e.g., 1/10) of the value $R_{60}$ of resistor 60, as described above, then $$VTR=(I_{160}+I_{80})*(R_{60}/10) \quad (7).$$

Substituting equations (5) and (6) into equation (7), and letting $K_{80}=K_{150}/2$ yields:

$$VTR=[(V_{TIP}-V_{RING}-V_{BE20}-V_{BE50})/(K_{80}R_{60})+[(V_{BE20}+V_{BE50})/(K_{80}R_{60})]*(R_{60}/10), \text{ or}$$

$$VTR=(V_{TIP}-V_{RING})/10K_{80} \quad (8).$$

Thus, summing the two mirrored and scaled currents $I_{80}$ and $I_{160}$ at the single ended tip-ring voltage measurement node 101 results in the base-emitter voltage drop representative components canceling one another, leaving a net current $I_{103}$ through the voltage-dropping output-scaling resistor 103 that is representative of only the differential tip-ring voltage. As a consequence, the voltage VTR produced at output node 101 (relative to ground-referenced node 103) of the loop voltage detector section 1 is a precise fraction of only the voltage differential ($V_{TIP}-V_{RING}$), irrespective of the relative values of the voltages at the tip and ring terminals.

It may be noted that the tip-ring voltage scaling factor of $1/10K_{80}$ of equation (8) is a non-limiting example. The measured loop voltage scaling factor can be set as desired with appropriate choice of the values of components, including the value $R_{102}$ of the resistor 102, across which the voltage VTR is derived, relative to the value $R_{60}$ of the resistor 60 of tip-ring sense rectifier circuit 15, through which the differential tip-ring voltage is sensed.

In order to modulate the duty cycle of the waveform derived from the ringing signal in proportion to line length, the precision tip-ring output voltage VTR produced at the single ended output node 101 is coupled to a first, high impedance, inverting (−) input 201 of a comparator circuit 200 within the periodic waveform modulation section 2. Comparator circuit 200 has a second, high impedance, non-inverting input 202 coupled to a ground-referenced integration capacitor 210, to which a current source 220 supplying a current $I_{220}$ is coupled. The second input 202 of the comparator circuit 200 is further coupled to a first port 231 of a first switch 230 having a variable connection 234 between an open position (shown) and a closed position at a second port 232 coupled to ground (GND).

The position of the variable connection 234 of the first switch 230 depends upon the operation of a switch control node 233 that is coupled to a switch control line 225. As will be described, when the ringer voltage is at or above ground potential, current from the ringer is by-passed to ground, so that it cannot be mirrored by way of a control line 225 from the collector 253 of a current mirror transistor 250 within a current mirror 260. In this mode, the variable connection 234 is closed to the second switch port 232, thereby coupling a zero or ground potential to the non-inverting input 202 of comparator 200.

On the other hand, when the ringer voltage is below ground potential, current from the ringer is not by-passed to ground, but is mirrored over the control line 225, causing the control node 233 to open the variable connection 234, thereby allowing whatever voltage is provided across capacitor 210 to the non-inverting input 202 of comparator 200. In this latter condition, the fundamental operation of the capacitor 210 dictates that:

$$\Delta V_{210}/\Delta t=I_{220}/C_{210} \quad (9)$$

The first input 201 of comparator circuit 200 is further coupled to a first port 241 of a second switch 240 having a variable connection 244 between an open position (shown) and a closed position at a second port 242 coupled to ground (GND). As in the case of the first switch 231, the position of the variable connection 244 of the second switch 240 depends upon the operation of switch control node 233. Again, when the ringer voltage is at or above zero (ground potential), no current is supplied over the control line 225 from the current mirror, so that switch control node 233 closes the variable connection 244 to the second port 242, thereby coupling a zero or ground potential to the inverting input 201 of the comparator 200. On the other hand, when the ringer voltage is below ground potential, current is supplied over control line 225, so that the variable connection 244 to the second port 232 is open, thereby allowing the measured tip-ring differential at node 101 to be coupled to inverting input 201 of comparator 200.

As described above, the switch control line 225 is coupled to the collector 253 of the current mirror PNP transistor 250 within current mirror circuit 260. The emitter 252 of the current mirror transistor 250 is coupled through a resistor 254 to the VCC power supply rail 16, and its base 251 is coupled in common with the base 271 and collector 273 of diode-connected current mirror PNP transistor 270, which has its emitter 272 coupled through resistor 274 to the VCC power supply rail 16. The collector-base connection of transistor 270 is further coupled to the collector 283 of common base NPN transistor 280, the base 281 of which is grounded. The emitter 282 of transistor 280 is coupled to the emitter 292 of a diode-connected PNP transistor 290 and through a resistor 284 to a ringing signal (RINGER) terminal 300, to which a ringing signal is coupled. Diode-connected transistor 290 has its base 291 and collector 293 coupled to ground.

The periodic waveform modulation section 2 operates as follows. As pointed out above, the variable connections 234 and 244 of respective switches 230 and 240 are in their closed positions with terminals 232 and 242, so long as no current is supplied over the control line 225 to the switch control node 233 from the collector 253 of the current mirror transistor 250. In order for the current mirror transistor 250 to mirror current, there must be current supplied to the collector-emitter path of transistor 270. This only occurs when the ringer voltage (which may reach a value between +100 and −200 volts) applied to the ringer terminal 300 is at or greater than ground potential, corresponding to the relatively positive state of the amplitude of the ringer voltage which, as described above, varies between first (e.g. relatively positive) and second (e.g., relatively negative) states.

In particular, a positive ringer voltage at ringer terminal 300 is coupled through resistor 284 to the emitter 292 of transistor 290, thereby forward biasing and turning on transistor 290, while reverse biasing transistor 280, so that ringer current is by-passed to ground through the ringer signal input resistor 284 and transistor 290. However, when the ringer voltage waveform is in its relatively negative state (below ground), transistor 290 is turned off, whereas transistor 280 is turned on, so as to provide a current flow path (from the VCC rail 16) to the ringer through resistor 284—transistor 280—transistor 270 and the resistor 274. This ringer current is mirrored by the current mirror transistor 250 and applied over the control line 225 to the switch control node 233, opening both switches 230 and 240.

Thus, when the ringer voltage is in its relatively positive state (above ground potential), both inputs 201 and 202 to the comparator 200 are grounded through closed switches 230 and 240, causing the comparator output 203 to be at a prescribed (built-in) 'high' logic state. In terms of the dynamics of the ringing signal's periodic waveform, at the time that the ringer voltage transitions from its relatively positive state to its relatively negative state, both switches 230 and 240 are opened and the potential at the inverting input 201 very rapidly acquires the value of the differential tip-ring voltage at node 101.

However, the non-inverting input 202 of the comparator 200 initially remains at zero volts, due to the inherent delay associated with the properties of the capacitor 210. This forces the comparator's output terminal 203 to quickly transition from its previous logic 'high' state to a logical 'low' state. The potential at the comparator's non-inverting input 202 becomes increasingly positive at a charging rate established by equation (9). Within an error introduced by the prescribed (small) built-in offset voltage of the comparator 200, the comparator's output terminal 203 will transition from its present logical 'low' state to a logical 'high' state, when the differential voltage $\Delta V_{210}$ is approximately equal to the tip-ring differential voltage VTR at node 101.

Namely, in terms of equation (9)

$$I_{220}\Delta t/C_{210} = \rho(V_{TIP} - V_{RING}) \tag{10}$$

where $$\rho = (R_{74}/R_{84})*(R_{102}/R_{60}) \tag{11}$$

Equation (10) may be rewritten as:

$$\Delta t = \rho((V_{TIP} - V_{RING})/I_{220})*C_{210} \tag{12}$$

If $I_{220}$ is chosen to be proportional to the current limit value programmed into the SLIC, namely, $I_{210} = M*I_{LIM}$, then equation (12) becomes $$\Delta t = (\rho/M)*((V_{TIP} - V_{RING})/I_{LIM})*C_{210} \tag{13}$$

When the SLIC is driving a line that is sufficiently short to operate in the current limit, then equation (12) becomes $$\Delta t = (\rho/M)*(R_{LINE}*C_{210}) \tag{14}$$

This means that the comparator output terminal 203 produces a periodic waveform having a frequency equal to that of the ringer signal applied to terminal 300 and is at a logic 'low' state for the duration defined by the magnitude of the measured tip-ring voltage. Namely, the duty cycle of the successive pulses of the periodic waveform (derived from the ringer signal) will be proportional to the tip-ring voltage of the telephone line.

It should also be noted that, if preferred, the lower bound for the line resistance can be established at a value corresponding to the resistance $R_{LINE}$ in equation (14).

As will be appreciated from the foregoing description, the periodic waveform-based wireline measurement circuit architecture of the present invention derives a voltage that is very precisely proportional to the differential voltage across a wireline pair, and uses this voltage to modulate the width of a periodic waveform, such as one derived from the ringing signal. This periodic waveform can be readily interfaced in an asynchronous manner with digital processing components, such as a DSP codec, to provide for automatic compensation for the resistance of the phone line.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A circuit for producing an output signal representative of a measured parameter of a telephone wireline comprising:

tip and ring ports, adapted to be respectively coupled to said tip and ring leads of said telephone wireline;

a tip-ring voltage measurement circuit coupled to said tip and ring ports, and being operative to produce an output voltage representative of a differential tip-ring voltage across said tip and ring ports;

a modulator, coupled to said tip-ring voltage measurement circuit and being operative to modulate a periodic waveform in accordance with said output voltage produced by said tip-ring voltage measurement circuit; and an output circuit that is operative to couple said periodic waveform modulated by said modulator to a digital signal processing (DSP) circuit, and wherein said periodic waveform modulated by said modulator is not coupled to said tip and ring ports.

2. The circuit according to claim 1, wherein said modulator is operative to modulate the duty cycle of said periodic waveform in accordance with said output voltage produced by said tip-ring voltage measurement circuit.

3. The circuit according to claim 1, wherein said periodic waveform is derived from a ringing signal.

4. The circuit according to claim 1, wherein said tip-ring voltage measurement circuit includes a tip-ring voltage detector coupled to said tip and ring ports, and being operative to produce at a current output node thereof an output current representative of the composite of said differential tip-ring voltage and a voltage associated with internal characteristics of said tip-ring voltage detector;

a differential current extraction circuit coupled to said current output node, and being operative to generate a first current component that is fractionally proportional to said output current produced at said current output node of said tip-ring voltage detector, and a second current component that is fractionally proportional to said voltage associated with internal characteristics of said tip-ring voltage detector; and an output node having an output resistor coupled thereto and being coupled to receive a combination of said first and second current components generated by said differential current extraction circuit so as to produce only said differential tip-ring voltage.

5. The circuit according to claim 4, wherein said modulator includes a comparator having a first input controllably coupled by way of a first controlled switch between a variable reference voltage and a fixed reference potential, and a second input coupled by way of a second controlled switch between said output node and said fixed voltage reference potential, and wherein said first and second controlled switches are controlled in accordance with said periodic waveform, so that an output of said comparator modulates the duty cycle of said periodic waveform in accordance with said differential tip-ring voltage produced at said output node by said tip-ring voltage measurement circuit.

6. The circuit according to claim 5, wherein said tip-ring voltage detector is configured as a tip-ring sense rectifier circuit containing complementary transistor pairs coupled to said tip and ring ports, and being intercoupled through a tip-ring voltage sensing resistor, so as to produce said output current as representative of the composite of a rectified differential tip-ring voltage, plus base-emitter voltage drops of a complementary pair of said transistors of said tip-ring sense rectifier circuit, and wherein said differential current extraction circuit is operative to generate said first current component in proportion to the sum of the differential tip-ring voltage plus the base-emitter voltage drops of said complementary pair of transistors of said tip-ring sense rectifier circuit, and said second current component as fractionally proportional to only said base-emitter voltage drops of said complementary pair of transistors of said tip-ring sense rectifier circuit.

7. The circuit according to claim 6, wherein said differential current extraction circuit comprises a first current mirror circuit, coupled to said output node and being operative to generate said first current component, an auxiliary voltage reference circuit, coupled to receive a mirrored current from said first current mirror circuit and being operative to produce an auxiliary current that is fractionally proportional to only the base-emitter voltage drops of said complementary pair of transistors of said tip-ring sense rectifier circuit, and a second current mirror circuit coupled to mirror and attenuate said auxiliary current as said second current component.

8. The circuit according to claim 7, wherein said auxiliary voltage reference circuit comprises an interconnected pair of complementary transistors having characteristics such that they operate at the same current densities as complementary transistor pairs of the tip-ring sensing rectifier, and generate said auxiliary reference voltage as representative of only base-emitter voltage drops of said one of said complementary pairs of transistors of said tip-ring sense rectifier circuit, and a scaling resistor coupled to receive said auxiliary reference voltage thereacross and to produce said auxiliary current.

9. The circuit according to claim 7, wherein said first current mirror circuit has an input port coupled to said output node, a first current mirror port supplying said first current component, and a second current mirror port coupled to said auxiliary voltage reference circuit, and wherein said second current mirror has an input port coupled to receive said auxiliary current and a current mirror port coupled to mirror and attenuate said auxiliary current as said second current component.

10. A circuit for producing an output signal representative of resistance of a telephone wireline comprising:

tip and ring ports, adapted to be respectively coupled to said tip and ring leads of said telephone wireline;

a tip-ring voltage measurement circuit coupled to said tip and ring ports, and being operative to produce an output representative of said resistance;

a modulator, coupled to said tip-ring voltage measurement circuit and being operative to modulate the duty cycle of a periodic waveform in accordance with said output voltage produced by said tip-ring voltage measurement circuit; and an output circuit that is operative to couple said periodic waveform modulated by said modulator to a digital signal processing (DSP) circuit, and wherein said periodic waveform modulated by said modulator is not coupled to said tip and ring ports.

11. A circuit according to claim 10, wherein said periodic waveform is derived from a ringing voltage signal.

12. A method for producing an output signal representative of a measured parameter of a telephone wireline comprising:

(a) measuring the differential tip-ring voltage across said telephone wireline;

(b) modulating a periodic waveform in accordance with said differential tip-ring voltage measured in step (a); and coupling said periodic waveform modulated in step (b) to a digital signal processing (DSP) circuit, but not coupling said modulator periodic waveform to tip and ring terminals of said telephone wireline.

13. The method according to claim 1, wherein step (b) comprises modulating the duty cycle of said periodic waveform in accordance with said differential tip-ring voltage measured in step (a).

14. The method according to claim 12, wherein said periodic waveform is derived from a ringing signal.

15. A method according to claim 12, wherein step (a) comprises (a1) sensing, by means of a tip-ring voltage detector coupled to tip and ring leads of said telephone wireline, a differential voltage across said tip and ring leads of said telephone wireline and producing a tip-ring voltage-associated output current representative of the composite of said differential voltage and a voltage associated with internal characteristics of said tip-ring voltage detector, (a2) generating a first current component that is fractionally proportional to said tip-ring voltage-associated output current, and a second current component that is fractionally proportional to said voltage associated with internal characteristics of said tip-ring voltage detector, and (a3) combining said first and second current components generated in step (a2) to produce an output current representative of only said differential tip-ring voltage, and coupling said output current to an output resistor, which generates thereacross said differential tip-ring voltage.

16. The method of according to claim 15, wherein step (a1) comprises sensing the differential voltage across said tip and ring leads of said telephone wireline through complementary transistor pairs of a transistor-configured tip-ring sensing rectifier circuit, said complementary transistor pairs being intercoupled through a tip-ring voltage sensing resistor, and producing a tip-ring voltage-representative output current representative of the composite of a rectified differential tip-ring voltage, plus base-emitter voltage drops of a complementary pair of said transistors of said tip-ring sense rectifier circuit, and wherein step (a2) comprises generating said first current component as fractionally proportional to the sum of the differential tip-ring voltage plus the base-emitter voltage drops of said complementary pair of transistors of said tip-ring sense rectifier circuit, and said second current component as fractionally proportional to only said base-emitter voltage drops of said complementary pair of transistors of said tip-ring sense rectifier circuit.

17. The method according to claim 16, wherein step (a2) comprises coupling said tip-ring voltage-representative output current to a first current mirror circuit, and producing therefrom a first mirrored current as said first current component, and a second mirrored current, and producing from said second mirrored current an auxiliary current that is proportional to only base-emitter voltage drops of said complementary pair of transistors of said tip-ring sense rectifier circuit, and generating said second current component in accordance with said auxiliary current.

18. The method circuit according to claim 17, wherein said auxiliary current is produced by an auxiliary voltage reference circuit comprising an interconnected pair of complementary transistors having characteristics such that they operate at the same current densities as complementary transistor pairs of the tip-ring sensing rectifier, said auxiliary voltage reference circuit generating an auxiliary reference voltage representative of only base-emitter voltage drops of said one of said complementary pairs of transistors of said tip-ring sensing rectifier circuit, and wherein said auxiliary current is generated by a scaling resistor coupled to receive said auxiliary reference voltage thereacross.

19. The method according to claim 15, wherein step (b) comprises modulating said periodic waveform by way of a comparator having a first input controllably coupled by way of a first controlled switch between a variable reference voltage and a fixed reference potential, and a second input coupled by way of a second controlled switch between said output resistor and said fixed voltage reference potential, and wherein said first and second controlled switches are controlled in accordance with said periodic waveform, so that an output of said comparator modulates the duty cycle of said periodic waveform in accordance with said differential tip-ring voltage produced at said output resistor.

20. The method according to claim 19, wherein said periodic waveform is derived from a ringing voltage signal.

* * * * *